(12) United States Patent
Yamamoto et al.

(10) Patent No.: US 8,113,666 B2
(45) Date of Patent: Feb. 14, 2012

(54) PROJECTOR AND REFLECTION APPARATUS WITH ADJUSTABLE REFLECTION SECTION

(75) Inventors: Takashi Yamamoto, Matsumoto (JP);
Hirokazu Kamatori, Matsumoto (JP);
Noriaki Miyasaka, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 426 days.

(21) Appl. No.: 12/406,610

(22) Filed: Mar. 18, 2009

(65) Prior Publication Data

US 2009/0237620 A1 Sep. 24, 2009

(30) Foreign Application Priority Data

Mar. 19, 2008 (JP) ................................ 2008-072054

(51) Int. Cl.
*G03B 21/28* (2006.01)
*G03B 21/14* (2006.01)
*G02F 1/135* (2006.01)

(52) U.S. Cl. ........... 353/98; 353/69; 353/70; 250/491.1; 349/30

(58) Field of Classification Search ............ 353/98, 353/69, 70; 250/491.1; 349/30
See application file for complete search history.

(56) References Cited

U.S. PATENT DOCUMENTS

| | | | | |
|---|---|---|---|---|
| 6,652,104 B2* | 11/2003 | Nishida et al. | ......... | 353/70 |
| 6,877,862 B2* | 4/2005 | Fukunaga et al. | ......... | 353/70 |
| 6,929,370 B2* | 8/2005 | Kobayashi et al. | ......... | 353/99 |
| 7,055,969 B2* | 6/2006 | Pate et al. | ......... | 353/99 |
| 7,258,451 B2* | 8/2007 | Wang | ......... | 353/99 |
| 7,494,227 B2* | 2/2009 | Yamazaki et al. | ......... | 353/85 |
| 2002/0122161 A1* | 9/2002 | Nishida et al. | ......... | 353/70 |
| 2006/0126028 A1* | 6/2006 | Ullman | ......... | 353/69 |
| 2008/0316438 A1* | 12/2008 | Midorikawa | ......... | 353/70 |

FOREIGN PATENT DOCUMENTS

| | | |
|---|---|---|
| JP | A-2-311891 | 12/1990 |
| JP | A-05-165097 | 6/1993 |
| JP | A-6-52289 | 7/1994 |
| JP | A-2002-262198 | 9/2002 |
| JP | A-2002-29087 | 10/2002 |
| JP | A-2003-280089 | 10/2003 |
| JP | A-2005-010391 | 1/2005 |
| JP | A-2006-47595 | 2/2006 |
| JP | A-2006-195318 | 7/2006 |
| JP | A-2006-201328 | 8/2006 |

* cited by examiner

*Primary Examiner* — Georgia Y Epps
*Assistant Examiner* — Magda Cruz
(74) *Attorney, Agent, or Firm* — Oliff & Berridge, PLC

(57) ABSTRACT

A projector includes a light source, a light modulator that modulates the light flux emitted from the light source in accordance with an image signal to form image light, a projection optical apparatus that enlarges and projects the image light, a reflection section having a reflection surface disposed along the direction in which the projection optical apparatus outputs the image light, the reflection surface reflecting the image light, and an adjustment section that adjusts the inclination angle of the reflection section with respect to the direction in which the image light travels.

5 Claims, 13 Drawing Sheets

PROJECTOR AND REFLECTION APPARATUS WITH ADJUSTABLE REFLECTION SECTION

BACKGROUND

1. Technical Field

The present invention relates to a projector and a reflection apparatus.

2. Related Art

There has been a projector including a light source, a light modulator that modulates the light flux emitted from the light source in accordance with an image signal, and a projection optical apparatus that enlarges and projects the image light. In general, such a projector is placed on a desk or hung from the ceiling and oriented in such a way that the image light is directed in a substantially horizontal direction. The projector then projects the image light on a screen or a wall surface provided in front of the projector.

In recent years, however, there is a desire to provide a projector capable of projecting image light on the ceiling. To meet such a desire, JP-A-2005-10391, for example, proposes a projector including a projector body from which image light exits and a support capable of holding the projector body at an arbitrary angle of rotation. The projector described in JP-A-2005-10391 can project image light on the ceiling by using the support to hold the projector body oriented upward.

The projector described in JP-A-2005-10391, however, is problematic in that the configuration of the support is complicated in order to support the heavy projector body and the support and hence the projector is increased in size.

SUMMARY

An advantage of some aspects of the invention is to provide a projector that can project an image on the ceiling and can be reduced in size, and a reflection apparatus.

A projector according to an aspect of the invention includes a light source, a light modulator that modulates the light flux emitted from the light source in accordance with an image signal to form image light, a projection optical apparatus that enlarges and projects the image light, a reflection section having a reflection surface disposed along the direction in which the projection optical apparatus outputs the image light, the reflection surface reflecting the image light, and an adjustment section that adjusts the inclination angle of the reflection section with respect to the direction in which the image light travels.

According to the aspect of the invention described above, since the image light outputted from the projection optical apparatus is reflected off the reflection section toward the ceiling and projected on the ceiling, the configuration of the reflection section can be simplified and reduced in size as compared to the case where the projector body inclined by the support and held in that state projects image light on the ceiling as in the projector described in JP-A-2005-10391, because it is not necessary to hold the inclined heavy projector body. The projector can therefore be reduced in size. Further, since the adjustment section can adjust the inclination angle of the reflection section with respect to the direction in which the image light travels, the range within which the image light is projected can be increased The projector according to the aspect of the invention described above preferably further includes a first inclination angle detector that detects the inclination angle of the reflection section with respect to the direction in which the image light travels, an acquisition section that acquires the image signal to be outputted to the light modulator, a distortion corrector that corrects the image signal not to distort the projected image based on the inclination angle detected by the first inclination angle detector, and an image signal output section that outputs the image signal corrected by the distortion corrector to the light modulator.

When the projector is placed on a horizontal surface, and the inclination angle of the reflection section (reflection surface) with respect to the direction in which the image light travels is adjusted to 45 degrees by the adjustment section, the image projected on the ceiling will not be distorted. When the inclination angle of the reflection section is not adjusted to 45 degrees, however, the projected image will have, for example, trapezoidal distortion. That is, the image formed on the ceiling will be distorted However, according to the aspect of the invention described above, since the image signal is corrected not to distort the projected image based on the inclination angle of the reflection section, it is possible to prevent the projected image from distorting. The image formed when image light is projected on the ceiling will therefore not be distorted.

The projector according to the aspect of the invention described above preferably further includes a second inclination angle detector that detects the inclination angle of the projector with respect to the horizontal plane, and the distortion corrector corrects the image signal based on the inclination angle detected by the second inclination angle detector.

When the inclination angle of the reflection section with respect to the direction in which the image light travels is adjusted to 45 degrees, but the projector is not horizontally installed, the projected image will be distorted.

However, according to the aspect of the invention described above, since the image signal is also corrected based on the inclination angle of the projector with respect to the horizontal plane, it is possible to sufficiently reduce the distortion of the projected image. The distortion of the image formed on the ceiling will be therefore further reduced.

The projector according to the aspect of the invention described above preferably further includes an operation section that outputs an operation signal according to an operation, and the adjustment section adjusts the inclination angle of the reflection section with respect to the direction in which the image light travels in accordance with the operation performed on the operation section.

According to the aspect of the invention described above, since the adjustment section adjusts the inclination angle of the reflection section in accordance with the user's operation on the operation section, the image light can be projected in a user's desired direction.

A reflection apparatus according to another aspect of the invention is removably provided in a projector including a light source, a light modulator that modulates the light flux emitted from the light source in accordance with an image signal to form image light, and a projection optical apparatus that enlarges and projects the image light. The reflection apparatus includes a reflection section having a reflection surface disposed along the direction in which the projection optical apparatus outputs the image light, the reflection surface reflecting the image light, and an adjustment section that adjusts the inclination angle of the reflection section with respect to the direction in which the image light travels.

According to the aspect of the invention described above, the configuration that is the same as the one described above can provide the same advantageous effects.

BRIEF DESCRIPTION OF THE DRAWINGS

The invention will now be described with reference to the accompanying drawings, wherein like numbers reference like elements.

DESCRIPTION OF EXEMPLARY EMBODIMENTS

An embodiment of the invention will be described below with reference to the drawings.

Figure 1:
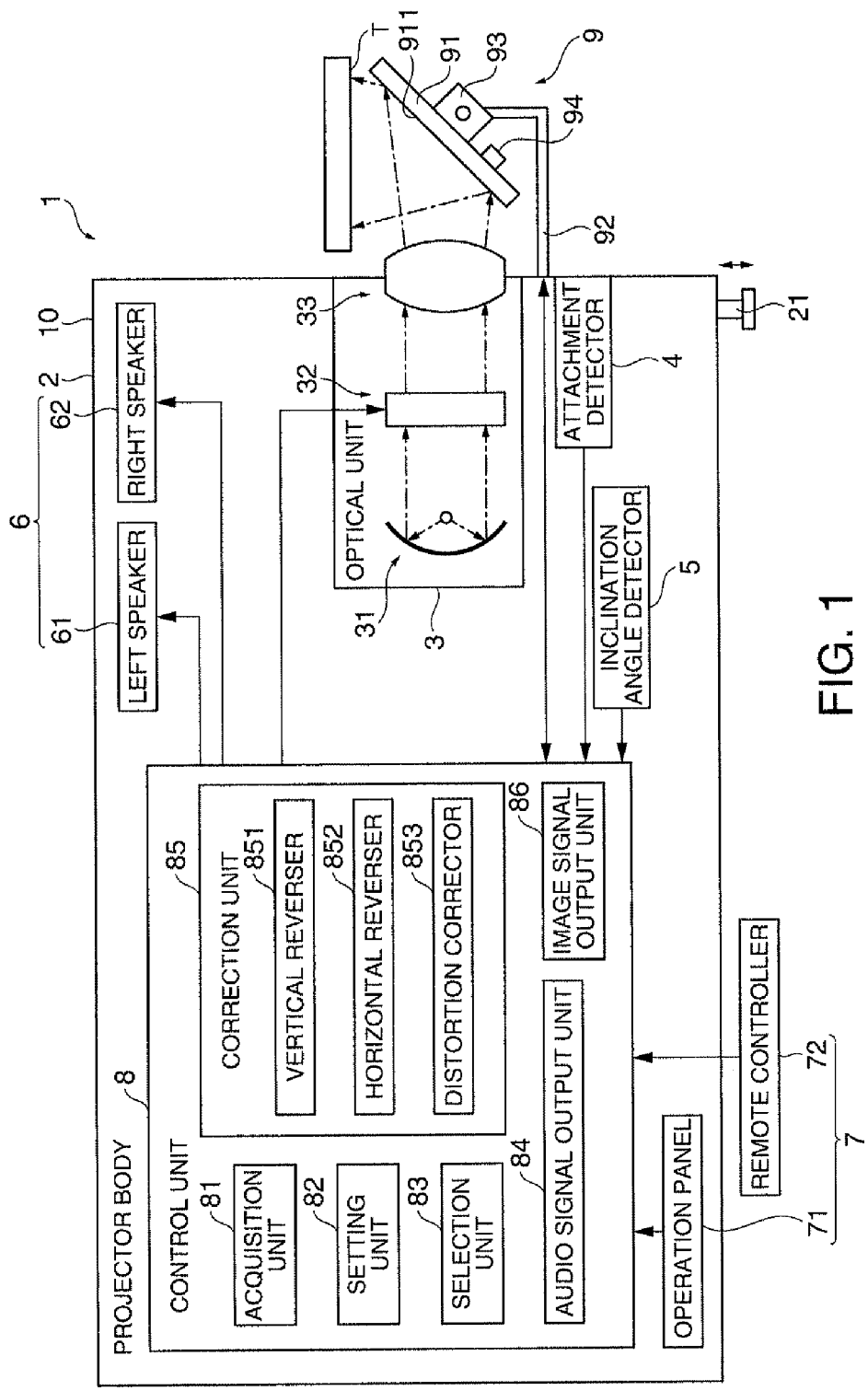
FIG. 1 is a block diagram showing the configuration of a projector according to an embodiment of the invention.

FIG. 1 is a block diagram showing the configuration of a projector 1 of the present embodiment.

The projector 1 is placed on the floor, a desk, or any other suitable horizontal surface, and not only enlarges and projects image light on the ceiling T or any other suitable projection surface but also outputs audio. The projector 1 includes a projector body 10 comprised of a housing 2, an optical unit 3, an attachment detector 4, an inclination angle detector 5, stereo speakers 6, an operation section 7, and a control unit 8; and a reflection apparatus 9.

The reflection apparatus 9 reflects image light having exited from a projection optical apparatus 33, which will be described later, in the optical unit 3 toward the ceiling T, and projects the image light on the ceiling T. The reflection apparatus 9 includes a reflection unit 91, a support 92, an adjuster 93, and a rotation angle detector 94. The reflection apparatus 9 is removably attached to the housing 2.

The reflection unit 91 is a reflection section of an embodiment of the invention. The reflection unit 91 includes a reflection surface 911 disposed along the direction in which the projection optical apparatus 33 outputs the image light, and reflects the image light having exited from the projection optical apparatus 33 toward the ceiling T.

One end of the support 92 is removably attached to the housing 2. The other end of the support 92 is attached to the adjuster 93, which holds the reflection unit 91. The support 92 supports the reflection unit 91 via the adjuster 93.

Figure 2:
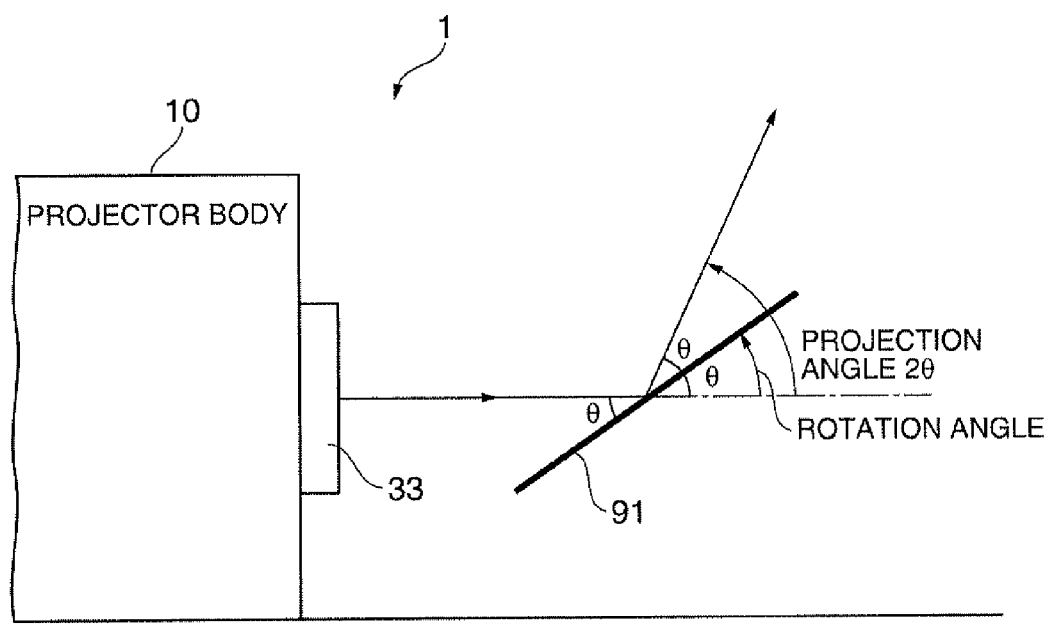
FIG. 2 is a side view showing the rotation angle of a reflection unit in the embodiment.

FIG. 2 is a side view showing the rotation angle θ of the reflection unit 91.

The adjuster 93 including the support 92 having a pivotal axis perpendicular to the direction in which the image light travels. The adjuster 93 pivotally holds the reflection unit 91 supported by the support 92. The adjuster 93 adjusts the rotation angle of the reflection unit 91 with respect to the central axis of the image light (the inclination angle of the reflection unit 91 with respect to the direction in which the image light travels: see FIG. 2) having exited from the projection optical apparatus 33 in accordance with a control signal outputted from the control unit 8 based on the operation performed on the operation section 7, which will be described later. The angle at which the image light to be projected on the ceiling T is projected is thus adjusted with respect to the horizontal direction.

The rotation angle detector 94 is a first inclination angle detector of an embodiment of the invention, and detects the rotation angle θ of the reflection unit 91 with respect to the central axis of the image light. As shown in FIG. 2, the projection angle is 2θ. Therefore, for the projector 1 horizontally placed, for example, the projection angle is 60 degrees when the rotation angle of the reflection unit 91 is 30 degrees, whereas the projection angle is 90 degrees when the rotation angle θ of the reflection unit 91 is 45 degrees. When the projector 1 is horizontally placed and the rotation angle θ of the reflection unit 91 is 45 degrees, an image formed on the ceiling T will not be distorted.

Referring back to FIG. 1, the housing, to which the reflection apparatus 9 is attached, has a box-like shape and houses the components 3 to 8 therein. Legs 21 are attached to the housing 2 on the side on which the projection optical apparatus 33, which will be described later, is provided. Each of the legs 21 is extendable, and extending the legs 21, for example, allows the image light from the projection optical apparatus 33 to be upwardly angled with respect to the horizontal plane.

The optical unit 3 forms image light in accordance with an image signal outputted from the control unit 8 and enlarges and projects the image light. The optical unit 3 includes a light source 31, a light modulator 32, and the projection optical apparatus 33. Although not shown, the optical unit 3 further includes a color separation optical apparatus that separates the light flux emitted from the light source 31 into R (red), G (green), and B (blue) color light beams, and a color synthesizing optical apparatus that synthesizes the color light beams, such as a cross dichroic prism.

The light source 31 includes a discharge-type light source lamp and a reflector that reflects the radiation light emitted from the light source lamp, and directs the light flux toward the color separation optical apparatus described above. The color separation optical apparatus separates the light flux emitted from the light source 31 into the R, G, B color light beams. The light modulator 32 includes three liquid crystal panels disposed on the light paths of the R, G, and B color light beams, which have been separated by the color separation optical apparatus, and modulates the incident light flux in accordance with the image signal outputted from the control unit 8. The color light beams modulated by the liquid crystal panels are synthesized by the color synthesizing optical apparatus.

The projection optical apparatus 33 includes a lens barrel and a plurality of projection lenses housed in the lens barrel, and enlarges and projects the image light synthesized by the color synthesizing optical apparatus.

The attachment detector 4 detects whether or not the reflection apparatus 9 is attached to the housing 2.

The inclination angle detector 5 is a second inclination angle detector of an embodiment of the invention, and is comprised of an acceleration sensor or any other suitable sensor. The inclination angle detector 5 detects the inclination angle of the projector 1 with respect to the horizontal plane when the projector 1 is installed in such a way that the central axis of the image light is oriented upward, for example, by extending the legs 21.

The stereo speakers 6 output audio under the control of the control unit 8. The stereo speakers 6 include a left speaker 61 disposed on the left in the housing 2 when viewed in the direction in which the image light travels and a right speaker 62 disposed on the right in the housing 2 when viewed in the direction in which the image light travels.

The operation section 7 includes an operation panel 71 provided on the housing 2 and a remote controller 72, and outputs an operation signal according to an input operation performed by an user to the control unit 8. When the user performs a predetermined operation on the operation section 7, the adjuster 93 is driven to adjust the rotation angle of the reflection unit 91 as described above. When the user performs another predetermined operation on the operation section 7, the mode of the projector 1 that relates to image formation and audio output is set to either a vertically reversed mode or a horizontally reversed mode, which will be described later.

The control unit 8 is comprised of a circuit board on which a CPU (Central Processing Unit) and a storage device are implemented, and controls the whole projector 1. The control unit 8 adjusts the image orientation and the left and right audio output in accordance with the mode that has been set. The control unit 8 includes an acquisition section 81, a setting section 82, a selection section 83, an audio signal output section 84, a correction section 85, and an image signal output section 86.

The acquisition section 81 acquires an image signal that relates to an image to be displayed and left and right audio signals from a personal computer or any other suitable external apparatus connected to the projector 1.

The setting section 82 sets the mode of the projector 1 to either the vertically reversed mode or the horizontally reversed mode in accordance with the operation signal outputted from the operation section 7 based on the input operation performed by the user.

The selection section 83 activates sections 851 to 853 based on the mode that has been set when the attachment detector 4 detects that the reflection apparatus 9 has been attached to the housing 2. That is, the selection section 83 activates a vertical reverser 851 and a distortion corrector 853, which will be described later, when the mode of the projector 1 has been set to the vertically reversed mode, whereas activating a horizontal reverser 852 and the distortion corrector 853, which will be described later, when the mode of the projector 1 has been set to the horizontally reversed mode.

The audio signal output section 84 selectively outputs the left audio signal and the right audio signal to the left speaker 61 and the right speaker 62 under the instruction from the correction section 85.

Figure 3:
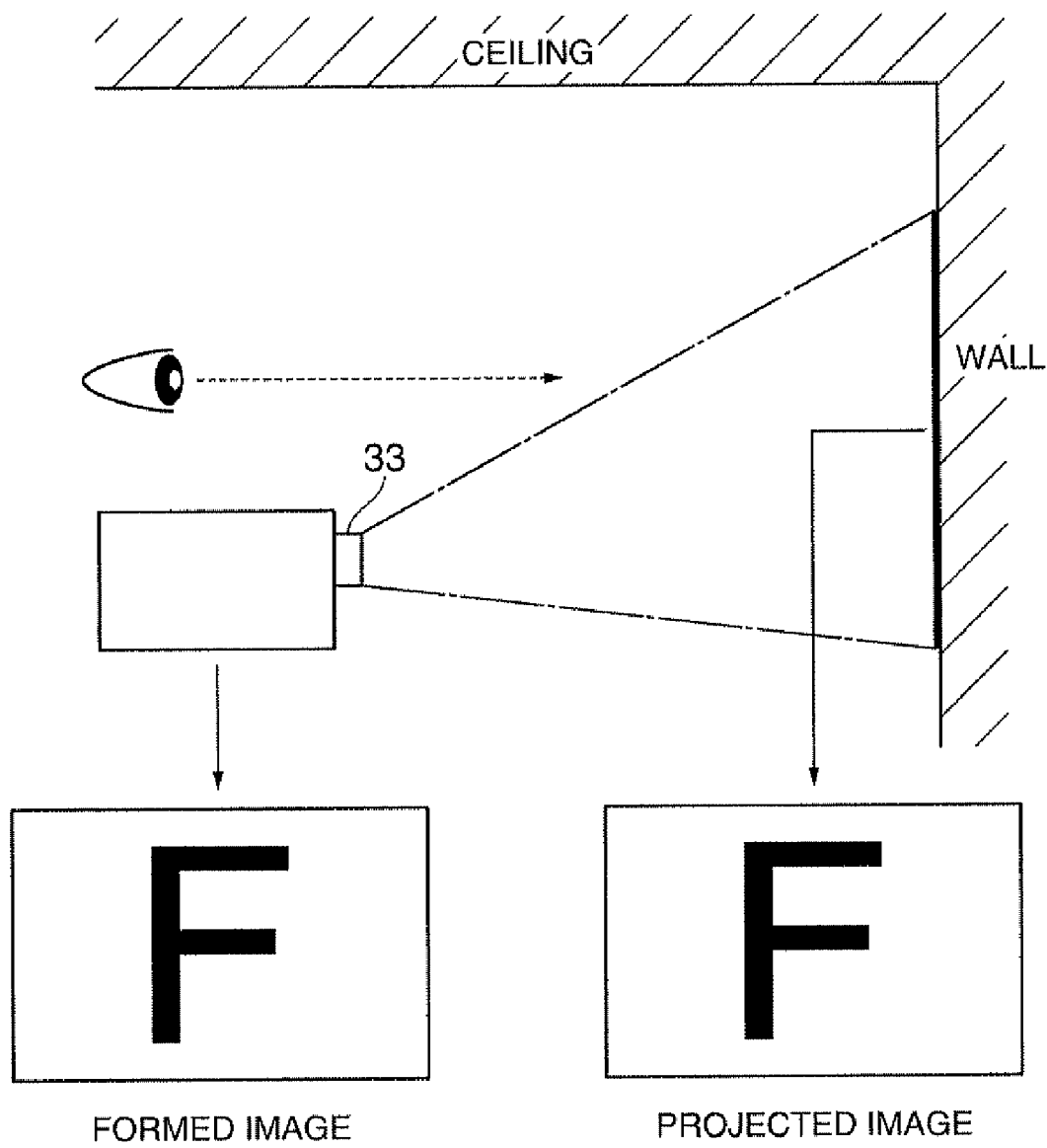
FIG. 3 shows an image projected on a vertical wall surface with respect to the floor surface in the embodiment.
Figure 4:
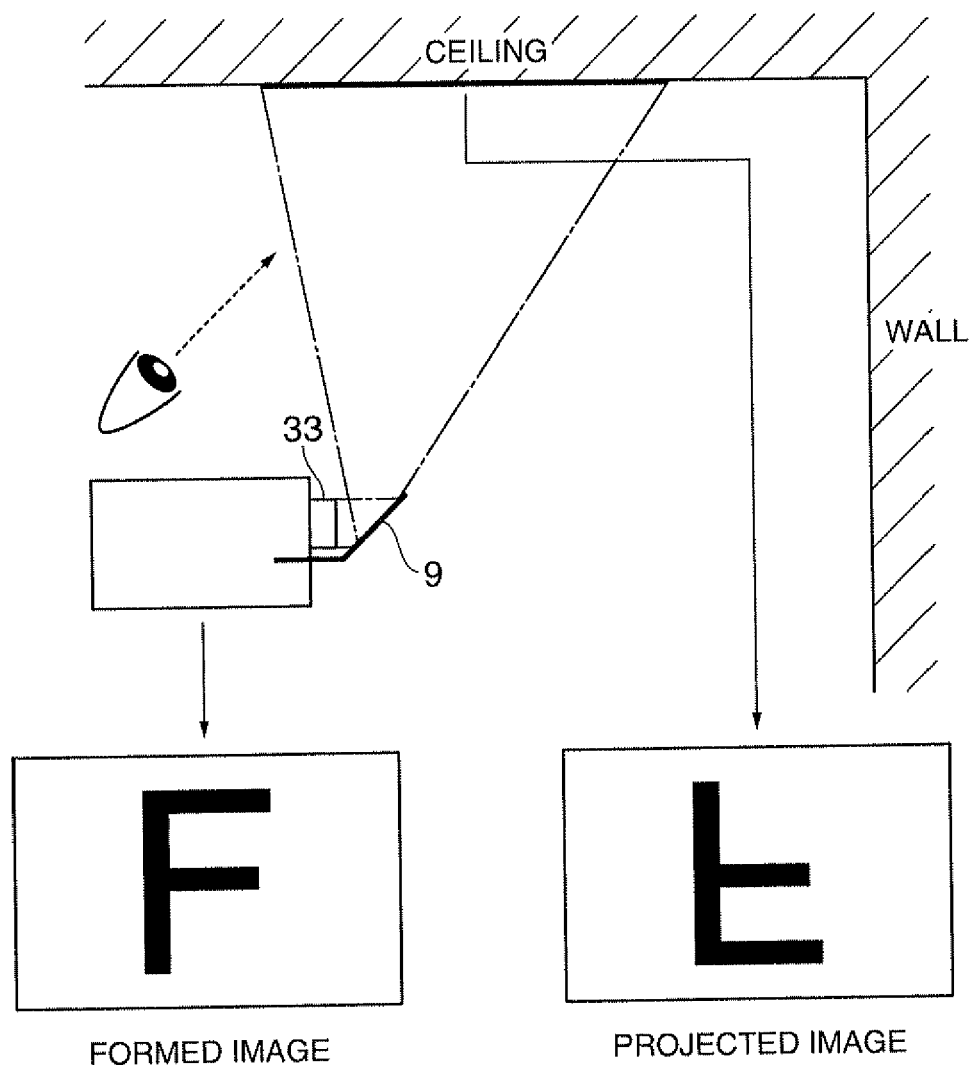
FIG. 4 shows an image projected on the ceiling when a user views the projected image with the body of the user oriented in the direction in which a projection optical apparatus outputs image light in the embodiment.

The correction section 85 corrects the image signal and selectively outputs the left and right audio signals to the speakers 61 and 62 in accordance with the mode that has been set. The image signal output section 86 outputs the image signal corrected by the correction section 85 to the light modulator 32. The correction section 85 includes the vertical reverser 851, the horizontal reverser 852, and the distortion corrector 853, FIG. 3 shows an image projected on a vertical wall surface with respect to the floor surface. In FIG. 3, the image formed by the light modulator 32 and the image projected on the wall surface are drawn in the same scale. FIG. 4 shows an image projected on the ceiling T when the user views the projected image with the body of the user oriented in the direction in which the projection optical apparatus 33 outputs the image light.

As shown in FIG. 3, when the projector installed horizontally projects image on the vertical wall in front of the projector without using the reflection apparatus 9, the orientation of image projected on the vertical wall and the orientation of image formed in the light modulator 32 are same.

As shown in FIG. 4, however, when the image outputted in the horizontal direction from the projection optical apparatus 33 (formed image) is reflected off the reflection apparatus 9 toward the ceiling T, and the user views the image formed on the ceiling T with the body (face) of the user oriented in the direction in which the projection optical apparatus 33 outputs the image light, the vertical orientation of the image is disadvantageously reversed from the original orientation, that is, the vertical orientation of the formed image.

Figure 5:
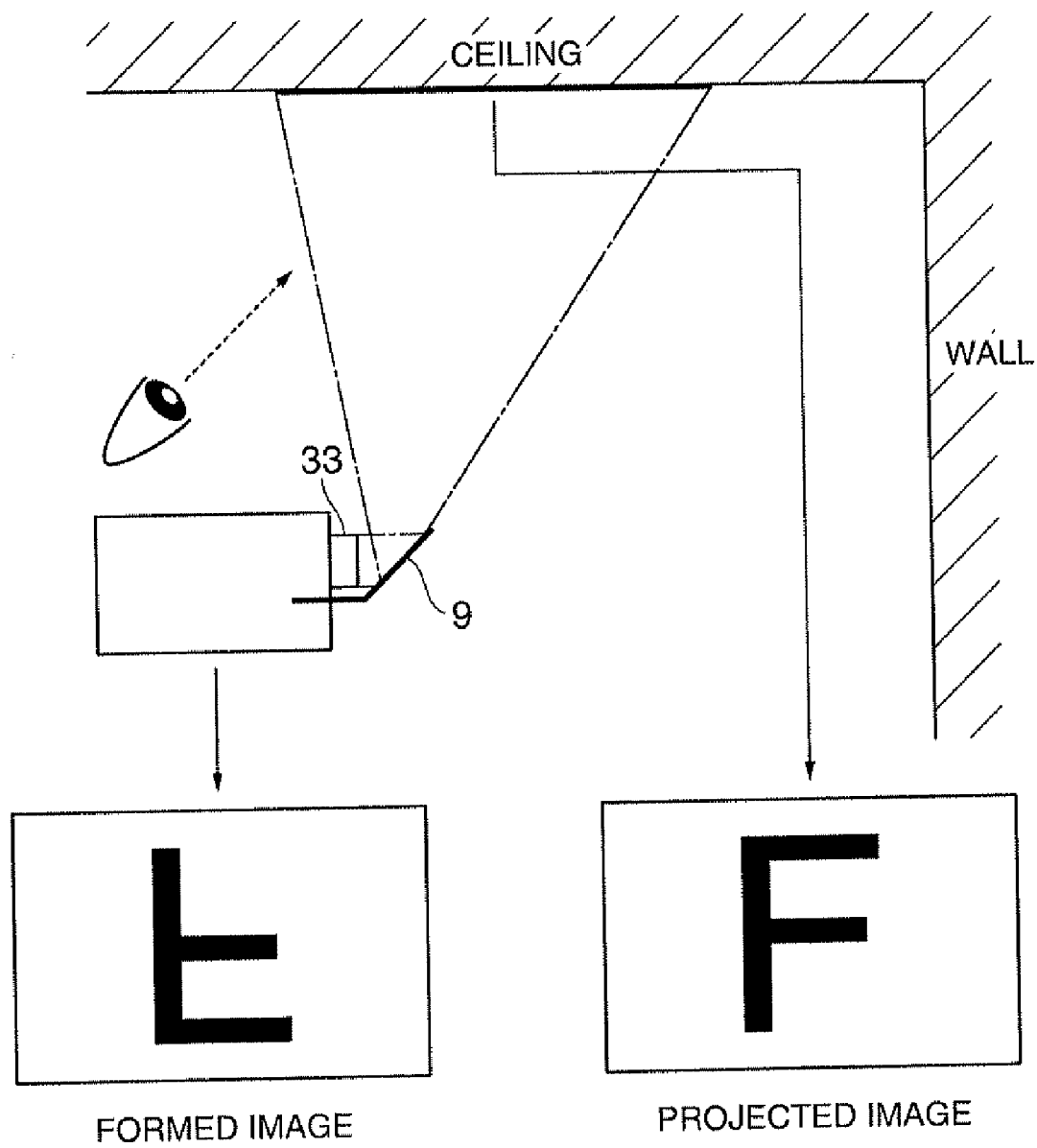
FIG. 5 shows a formed image according to an image signal corrected by a vertical reverser in the embodiment.

FIG. 5 shows a formed image according to an image signal corrected by the vertical reverser 851.

When the vertically reversed mode has been set, the vertical reverser 851 corrects the image signal in such a way that the vertical orientation of the image formed by the light modulator 32 is reversed from the vertical orientation of the image formed based on the image signal before the correction so that the light modulator 32 forms an image whose vertical orientation is reversed from the original orientation, as shown in FIG. 5. An appropriately oriented image is thus formed on the ceiling T.

That is, in the present embodiment, when the user views the projected image with the body of the user oriented in the direction in which the projection optical apparatus 33 outputs the image light, the user operates the operating unit 7 and sets the vertically reversed mode to instruct the selection section 83 to activate the vertical reverser 851. The vertical reverser 851 then instructs the light modulator 32 to form an image whose vertical orientation is reversed from the original orientation. An appropriately oriented image can be thus formed on the ceiling T. The vertical reverser 851 also instructs the audio signal output section 84 to output the left audio signal from the left speaker 61 and the right audio signal from the right speaker 62, as in the normal operation.

Figure 6:
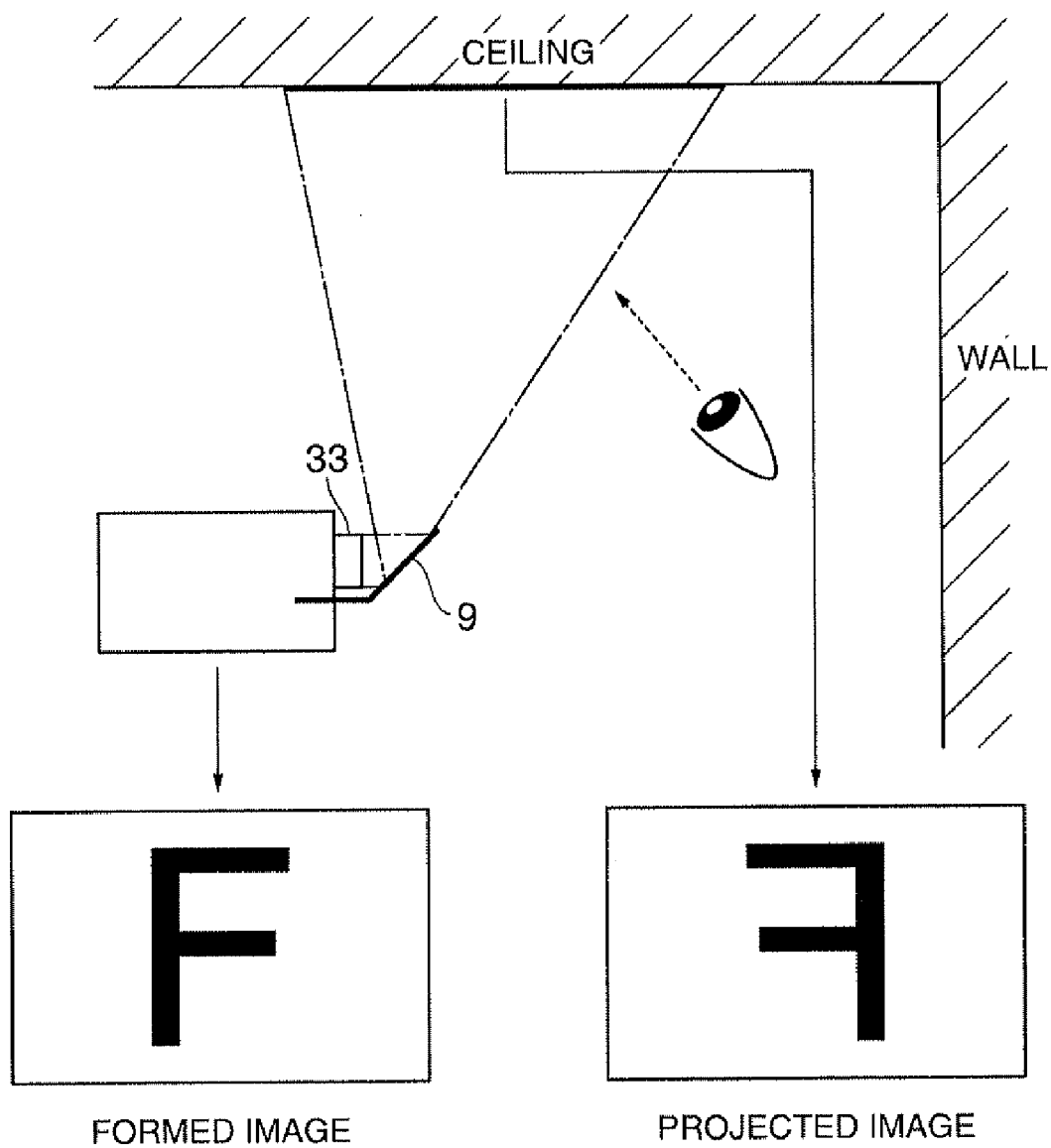
FIG. 6 shows an image projected on the ceiling when the user views the projected image with the body of the user oriented in the direction opposite the direction in which the projection optical apparatus outputs image light in the embodiment.
Figure 7:
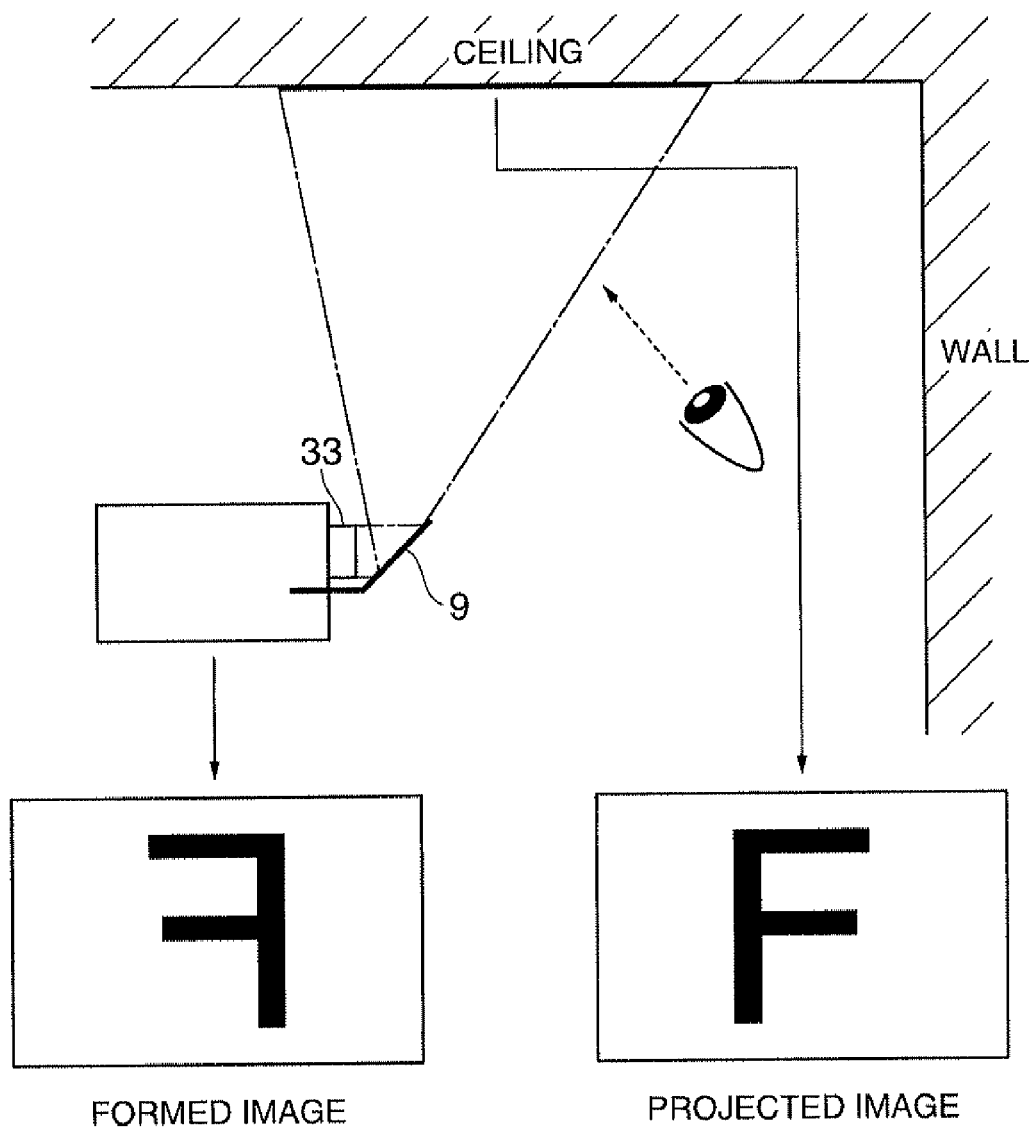
FIG. 7 shows a formed image according to an image signal corrected by a horizontal reverser in the embodiment.

FIG. 6 shows an image projected on the ceiling T when the user views the projected image with the body of the user oriented in the direction opposite the direction in which the projection optical apparatus 33 outputs the image light. FIG. 7 shows a formed image according to an image signal corrected by the horizontal reverser 852.

As shown in FIG. 6, when the image outputted in the horizontal direction from the projection optical apparatus 33 is reflected off the reflection apparatus 9 toward the ceiling T and projected on the ceiling T, and the user views the image formed on the ceiling T with the body of the user oriented in the direction opposite the direction in which the projection optical apparatus 33 outputs the image light, the horizontal orientation of the image formed on the ceiling T is disadvantageously reversed from the original orientation. Further, since the left and right speakers 61, 62 are reversed with respect to the ears of the user, the user disadvantageously hears reversed audio.

To address the above problem, when the user has set the horizontally reversed mode, the horizontal reverser 852 corrects the image signal under the instruction from the selection section 83 in such a way that the horizontal orientation of the image formed by the light modulator 32 is reversed from the horizontal orientation of the image formed based on the image signal before the correction so that the light modulator 32 forms an image whose horizontal orientation is reversed from the original orientation, as shown in FIG. 7. An appropriately oriented image is thus formed on the ceiling T. Further, the horizontal reverser 852 instructs the audio signal output section 84 to output the right audio signal from the left speaker 61 and the left audio signal from the right speaker 62, whereby the speakers 61 and 62 output audio that appropriately corresponds to the left and right ears of the user.

Figure 8:
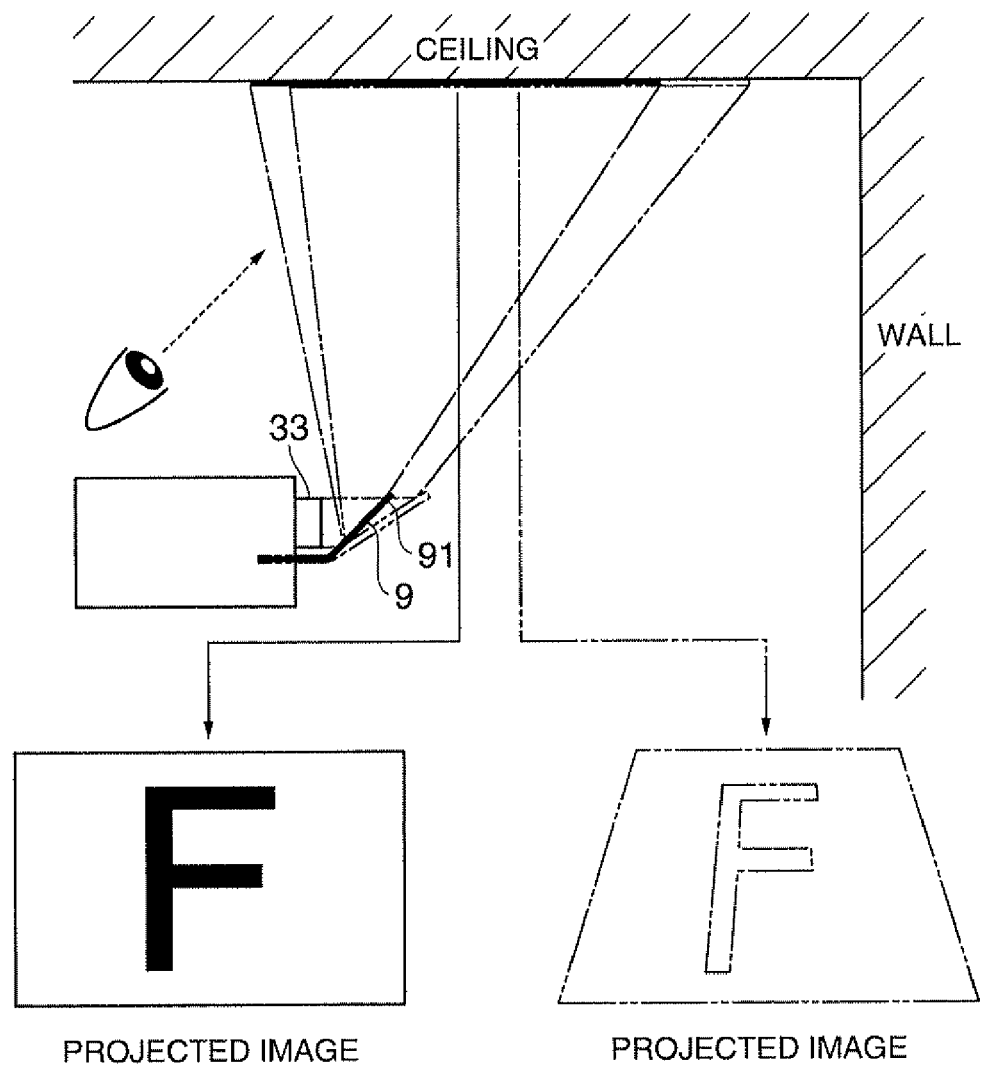
FIG. 8 shows distortion of a projected image when the reflection unit is held in such a way that the rotation angle thereof is 45 degrees or smaller in the embodiment.
Figure 9:
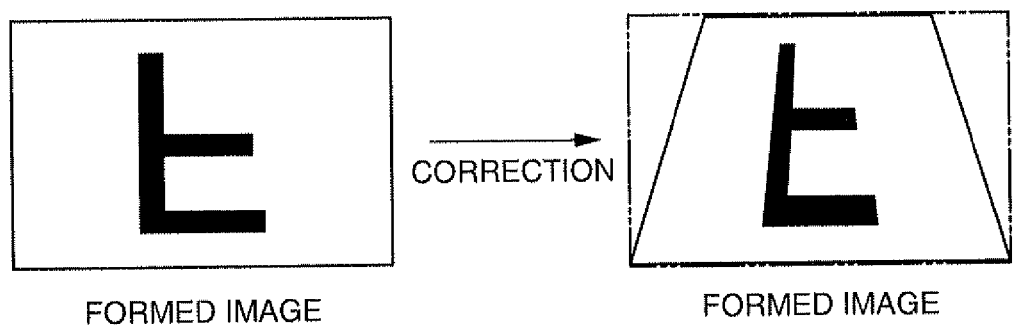
FIG. 9 shows a formed image according to an image signal corrected by a distortion corrector in the embodiment.

FIG. 8 shows distortion of a projected image when the reflection unit 91 is held in such a way that the rotation angle thereof is 45 degrees or smaller. FIG. 9 shows a formed image according to an image signal corrected by the distortion corrector 853.

When the projector is horizontally installed, and the reflection unit 91 is held by the adjuster 93 in such a way that the reflection angle of the image light is 45 degrees as indicated by the solid line in FIG. 8, the image projected on the ceiling T will not be distorted (The image formed on the ceiling T will not be distorted). However, when the projector 1 is installed in such a way that the central axis of the image light is oriented upward, for example, by extending the legs 21, or when the projector 1 is horizontally installed but the reflection unit 91 is held by the adjuster 93 in such a way that the reflection angle of the image light is not 45 degrees as indicated by the dashed line in FIG. 8, the projected image will be distorted.

To address the above problem, the distortion corrector 853 further corrects the image signal that has been corrected by the reverser 851 or 852 not to distort the projected image based on the rotation angle of the reflection unit 91 detected by the rotation angle detector 94 and the inclination angle of the projector 1 with respect to the horizontal plane detected by the inclination angle detector 5 under the instruction from the selection section 83.

Specifically, when the reflection unit 91 is held by the adjuster 93 in such a way that the rotation angle is not 45 degrees and the projector 1 is set to the vertically reversed mode in the horizontally installed projector, the distortion corrector 853 further corrects, for trapezoidal distortion (keystone), the image signal that has been corrected by the vertical reverser 851 based on the rotation angle of the reflection unit 91 detected by the rotation angle detector 94 and the inclination angle of the projector 1 with respect to the horizontal plane detected by the inclination angle detector 5, and instructs the light modulator 32 to form a trapezoidal image so that a non-distorted projected image is formed, as shown in FIG. 9. That is, a non-distorted image is formed on the ceiling T.

Figure 10:
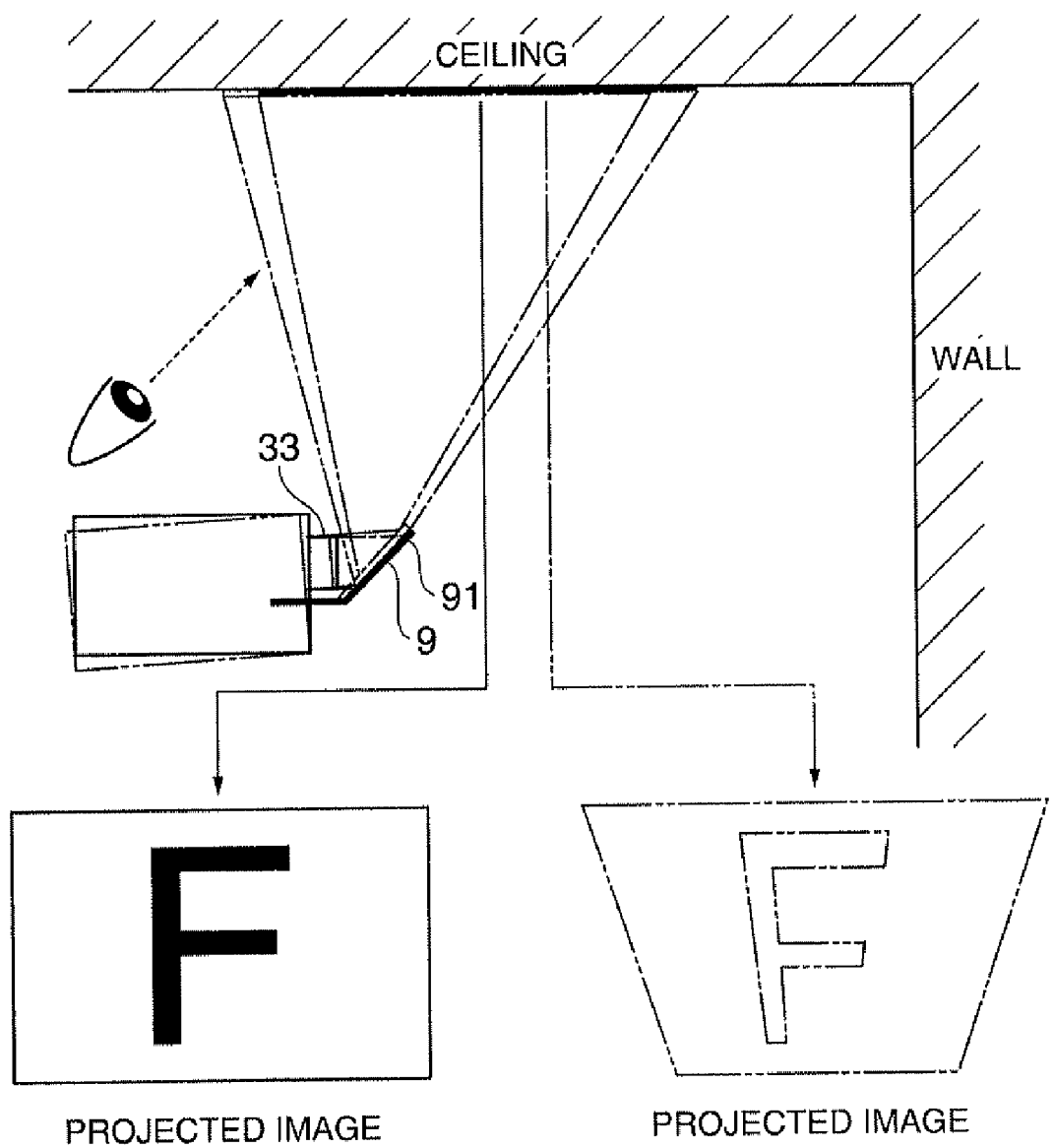
FIG. 10 shows distortion of a projected image when the projector is inclined to the horizontal plane along the central axis of outputted image light in the embodiment.

FIG. 10 shows distortion of a projected image when the projector 1 is inclined to the horizontal plane along the central axis of the outputted image light.

As shown in FIG. 10, when the reflection unit 91 is held by the adjuster 93 in such a way that the rotation angle is 45 degrees, but the projector 1 is inclined to the horizontal plane along the central axis of the outputted image light, for example, by extending the legs 21, a projected image also has longitudinal trapezoidal distortion. In this case as well, the distortion corrector 853 corrects the image signal for trapezoidal distortion (see FIG. 9) not to distort the image formed on the ceiling T, as in the case described above. The amount of trapezoidal distortion correction in this case is set to a value different from the amount of trapezoidal distortion correction in the case where the image light is projected on a vertical screen or any other suitable surface with respect to the floor surface.

Figure 11:
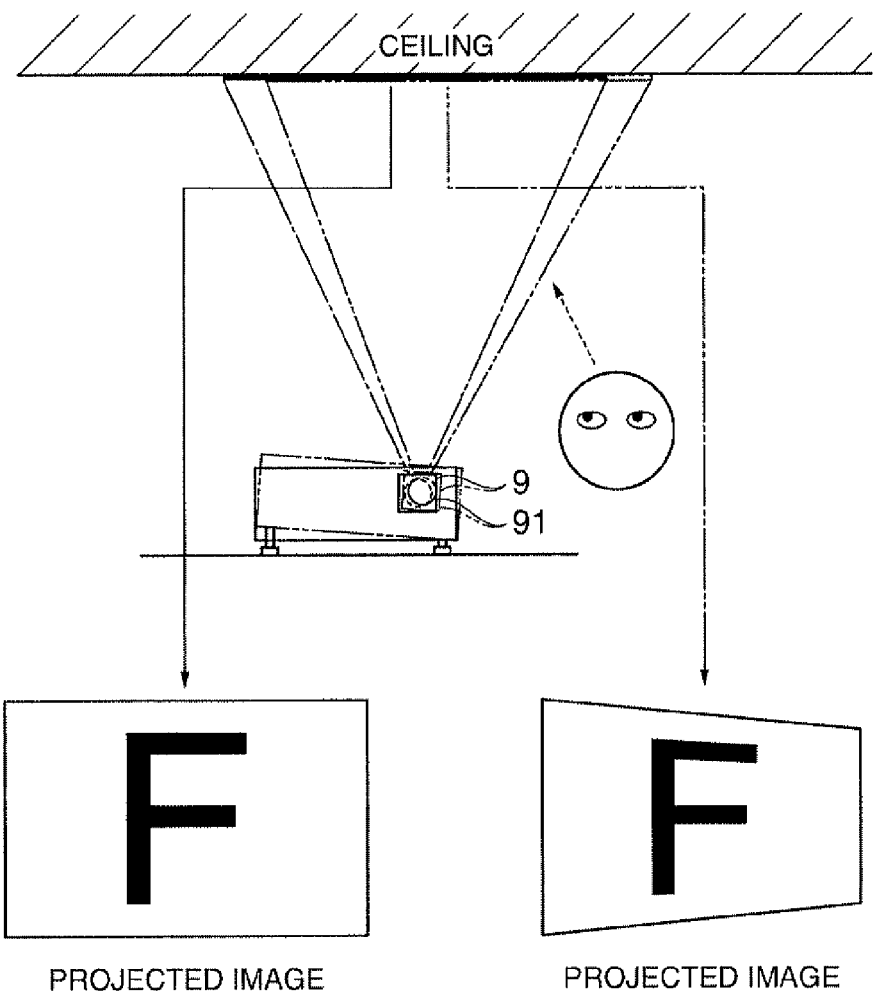
FIG. 11 shows distortion of a projected image when the projector is inclined in the embodiment.
Figure 12:
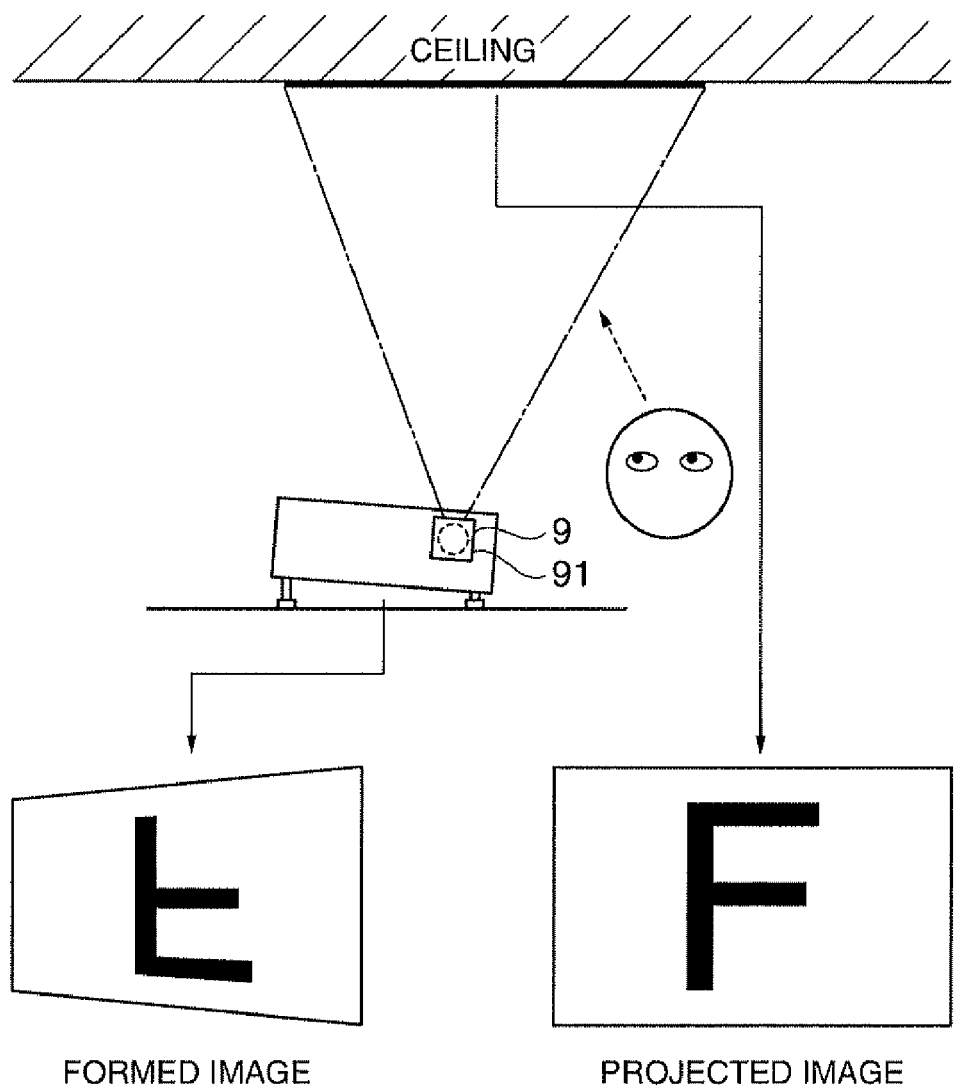
FIG. 12 shows a formed image according to an image signal corrected by the distortion corrector in the embodiment.

FIG. 11 shows distortion of a projected image when the projector 1 is inclined around the central axis of the outputted image light. FIG. 12 shows a formed image according to an image signal corrected by the distortion corrector 853.

When the projector 1 is inclined around the central axis of the outputted image light, an image formed on the ceiling T has lateral trapezoidal distortion, as shown in FIG. 11. In this case as well, the distortion corrector 853 performs trapezoidal distortion correction (lateral trapezoidal distortion correction) to prevent the image formed on the ceiling T from distorting, as shown in FIG. 12.

Figure 13:
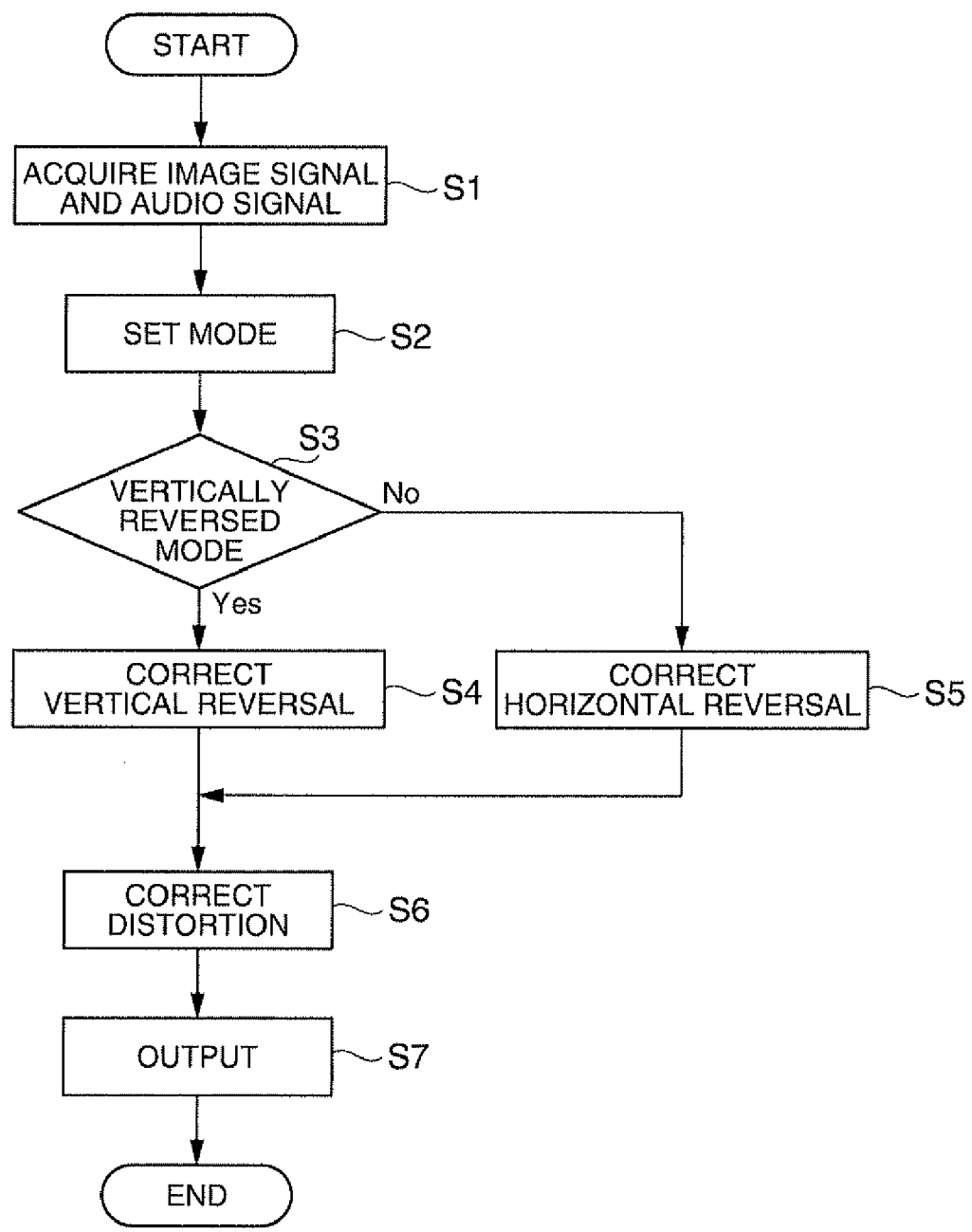
FIG. 13 is a flowchart showing adjustment of image orientation and left and right audio output in the embodiment.

Adjustment of the image orientation and the left and right audio output performed in the projector 1 will be described below. FIG. 13 is a flowchart showing the adjustment performed in the projector 1.

Each of the following steps is carried out when the user performs a predetermined operation on the projector 1. When the user performs a predetermined operation on the projector 1, the acquisition section 81 acquires an image signal that relates to an image to be displayed and left and right audio signals from a personal computer or any other suitable external apparatus connected to the projector 1 (step S1).

After the step S1, the setting section 82 sets the mode of the projector 1 to either the vertically reversed mode or the horizontally reversed mode in accordance with the operation signal outputted from the operation section 7 based on the input operation performed by the user (step S2).

After the step S2, when the attachment detector 4 detects that the reflection apparatus 9 has been attached to the housing 2, the selection section 83 activates the vertical reverser 851 and the distortion corrector 853 when the mode of the projector 1 has been set to the vertically reversed mode, whereas activating the horizontal reverser 852 and the distortion corrector 853 when the mode of the projector 1 has been set to the horizontally reversed mode. Specifically, when the attachment detector 4 detects that the reflection apparatus 9 has been attached to the housing 2, the selection section 83 judges whether the mode of the projector 1 has been set to either the vertically reversed mode or the horizontally reversed mode (step S3).

When the selection section 83 judges that the mode of the projector 1 has been set to the vertically reversed mode (step S3: YES), the vertical reverser 851 is activated.

That is, after the step S3, the vertical reverser 851 corrects the image signal in such a way that the vertical orientation of the image formed by the light modulator 32 is reversed from the vertical orientation of the image formed based on the image signal before the correction, and instructs the audio signal output section 84 to output the left audio signal from the left speaker 61 and the right audio signal from the right speaker 62 (step S4).

On the other hand, when the selection section 83 judges that the mode of the projector 1 has been set to the horizontally reversed mode (step S3: NO), the horizontal reverser 852 is activated, That is, after the step S3, the horizontal reverser 852 corrects the image signal in such a way that the horizontal orientation of the image formed by the light modulator 32 is reversed from the horizontal orientation of the image formed based on the image signal before the correction, and instructs the audio signal output section 84 to output the right audio signal from the left speaker 61 and the left audio signal from the right speaker 62 (step S5).

After the step S4 or S5, the distortion corrector 853 further corrects the image signal that has been corrected by the reverser 851 or 852 not to distort the projected image based on the rotation angle of the reflection unit 91 detected by the rotation angle detector 94 and the inclination angle of the projector 1 with respect to the horizontal plane detected by the inclination angle detector 5 (step S6). After the step S6, the image signal output section 86 outputs the corrected image signal to the light modulator 32 (step S7).

The projector 1 of the present embodiment described above can provide the following advantages:

Since the image light outputted from the projection optical apparatus 33 is reflected off the reflection unit 91 toward the ceiling T and projected on the ceiling T, the configuration of the reflection unit 91 can be simplified and reduced in size as compared to the case where the projector body inclined by the support and held in that state projects image light on the ceiling T as in the projector described in JP-A-2005-10391, because it is not necessary to hold the inclined heavy projector body. The projector 1 can therefore be reduced in size accordingly. Further, since the adjuster 93 can adjust the rotation angle of the reflection unit 91 with respect to the direction in which the image light travels, the range within which the image light is projected can be increased.

Since the adjuster 93 adjusts the rotation angle of the reflection unit 91 in accordance with the user's operation on the operation section 7, the image light can be projected in a user's desired direction.

The projector 1 includes the vertical reverser 851 that corrects the image signal in such a way that the vertical orientation of the image formed by the light modulator 32 is reversed, and the horizontal reverser 852 that not only corrects the image signal in such a way that the horizontal orientation of the formed image is reversed but also reverses the polarities of the left and right speakers 61, 62. In the thus configured projector 1, the vertical reverser 851 is activated when the user views the image formed on the ceiling T with the body of the user oriented in the direction in which the projection optical apparatus 33 outputs the image light, whereas the horizontal reverser 852 is activated when the user views the image formed on the ceiling T with the body of the user oriented in the direction opposite the direction in which the projection optical apparatus 33 outputs the image light. In this way, an appropriately oriented image can be formed on the ceiling T, and the left and right speakers 61, 62 can output appropriate audio that corresponds to the left and right ears of the user.

When the attachment detector 4 detects that the reflection apparatus 9 has been attached to the projector body 10, either of the reversers 851, 852 is automatically activated, whereby manual activation of the reverser 851 or 852 is not required when the reflection apparatus 9 is attached to the projector body 10.

Based on the user's operation on the operation section 7, the setting section 82 makes a setting in accordance of which the vertical reverser 851 or the horizontal reverser 852 is activated. The user can therefore make, based on the attitude of the user, a setting in accordance of which either of the reversers 851, 852 is activated. The image formation and the audio output can therefore be reliably and appropriately carried out.

Since the image signal is corrected not to distort a projected image based on the rotation angle of the reflection unit 91 with respect to the direction in which the image light travels, the image formed when image light is projected on the ceiling will not be distorted. Further, since the image signal is corrected not to distort the projected image also based on the inclination angle of the projector 1 with respect to the horizontal plane, the distortion of the image formed on the ceiling will be further reduced.

Variations

The invention is not limited to the embodiment described above, but variations and modifications are encompassed in the invention to the extent that they can achieve the advantage of the invention.

While in the above embodiment, the reflection apparatus 9 is removably attached to the projector body 10, the reflection apparatus 9 may be integrated with the projector body 10 so that the reflection apparatus 9 is fixed to the projector body 10. In this case, when the image light is directed in the horizontal direction, the reflection apparatus 9 may be configured in such a way that the reflection unit 91 is displaced not to block the light path of the image light. While in the above embodiment, the projector 1 is configured in such a way that which reverser 851 or 852 is activated is automatically selected by detecting whether or not the reflection apparatus 9 is attached, the projector 1 may alternatively be configured in such a way that either of the reversers 851, 852 is manually activated after the reflection apparatus 9 is attached.

While in the above embodiment, the reflection unit 91 is rotatably held, the reflection unit 91 may not be rotatably held, but may be held at a predetermined inclination angle.

While in the above embodiment, the light modulator includes liquid crystal panels, the light modulator may alternatively include a DMD (Digital Micromirror Device: a trademark of Texas Instruments, USA).

The invention is applicable to a projector and a reflection apparatus removably attached to the projector. In particular, the invention is preferably applicable to a projector used in a home theater and a reflection apparatus removably attached to the projector.

The entire disclosure of Japanese Patent Application Nos. 2008-072054, filed Mar. 19, 2008 is expressly incorporated by reference herein.

What is claimed is:

1. A projector comprising:
a light source;
a light modulator that modulates the light flux emitted from the light source in accordance with an image signal to form image light;
a projection optical apparatus that enlarges and projects the image light;
a reflection section having a reflection surface disposed along the direction in which the projection optical apparatus outputs the image light, the reflection surface reflecting the image light;
an adjustment section that adjusts the inclination angle of the reflection section with respect to the direction in which the image light travels;
a first inclination angle detector that detects the inclination angle of the reflection section with respect to the direction in which the image light travels;
an acquisition section that acquires the image signal to be outputted to the light modulator;
a distortion corrector that corrects the image signal not to distort the projected image based on the inclination angle detected by the first inclination angle detector;
an image signal output section that outputs the image signal corrected by the distortion corrector to the light modulator; and
a second inclination angle detector that detects the inclination angle of the projector with respect to the horizontal plane, wherein the distortion corrector corrects the image signal based on the inclination angle detected by the second inclination angle detector.

2. The projector according to claim 1, further comprising an operation section that outputs an operation signal according to an operation,
wherein the adjustment section adjusts the inclination angle of the reflection section with respect to the direction in which the image light travels in accordance with the operation performed on the operation section.

3. The projector according to claim 1, further comprising an operation section that outputs an operation signal according to an operation,
wherein the adjustment section adjusts the inclination angle of the reflection section with respect to the direction in which the image light travels in accordance with the operation performed on the operation section.

4. The projector according to claim 1, further comprising an operation section that outputs an operation signal according to an operation,
wherein the adjustment section adjusts the inclination angle of the reflection section with respect to the direction in which the image light travels in accordance with the operation performed on the operation section.

5. A reflection apparatus removably provided in a projector including a light source, a light modulator that modulates the light flux emitted from the light source in accordance with an image signal to form image light, and a projection optical apparatus that enlarges and projects the image light, the reflection apparatus comprising:
a reflection section having a reflection surface disposed along the direction in which the projection optical apparatus outputs the image light, the reflection surface reflecting the image light;
an adjustment section that adjusts the inclination angle of the reflection section with respect to the direction in which the image light travels; and
wherein the projector optical apparatus includes a first inclination angle detector that detects the inclination angle of the reflection section with respect to the direction in which the image light travels;
an acquisition section that acquires the image signal to be outputted to the light modulator;
a distortion corrector that corrects the image signal not to distort the projected image based on the inclination angle detected by the first inclination angle detector;
an image signal output section that outputs the image signal corrected by the distortion corrector to the light modulator; and
a second inclination angle detector that detects the inclination angle of the projector with respect to the horizontal plane, wherein the distortion corrector corrects the image signal based on the inclination angle detected by the second inclination angle detector.

* * * * *